(12) United States Patent
Kosinski

(10) Patent No.: US 6,397,520 B1
(45) Date of Patent: Jun. 4, 2002

(54) METHOD OF SUPPORTING PLANT GROWTH USING POLYMER FIBERS AS A SOIL SUBSTITUTE

(75) Inventor: Leonard Edward Kosinski, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/582,131

(22) PCT Filed: Nov. 12, 1998

(86) PCT No.: PCT/US98/26426
§ 371 (c)(1),
(2), (4) Date: Jun. 19, 2000

(87) PCT Pub. No.: WO99/31963
PCT Pub. Date: Jul. 1, 1999

Related U.S. Application Data

(60) Provisional application No. 60/068,221, filed on Dec. 19, 1997.

(51) Int. Cl.⁷ .............................................. A01G 31/00
(52) U.S. Cl. .......................................... 47/64; 47/48.1
(58) Field of Search ............................... 47/9, 58.1, 63, 47/64; 405/258.1

(56) References Cited

U.S. PATENT DOCUMENTS

| | | | |
|---|---|---|---|
| 3,467,609 A | 9/1969 | Adams | 260/17.4 |
| 3,831,317 A | 8/1974 | Porte | 47/58 |
| 3,866,352 A | 2/1975 | Herveling | 47/34 |
| 4,023,308 A | 5/1977 | Staby | 47/48.5 |
| 4,304,361 A | 12/1981 | Campbell | 241/24 |
| 4,618,531 A | 10/1986 | Marcus | 428/283 |
| 4,783,364 A | 11/1988 | Ilan | 428/288 |
| 4,794,038 A | 12/1988 | Marcus | 428/288 |
| 4,803,803 A | 2/1989 | Moffet | 47/59 |
| 5,053,482 A | 10/1991 | Tietz | 528/272 |
| 5,163,247 A | 11/1992 | Weber | 47/9 |
| 5,218,740 A | 6/1993 | Snyder | 19/66 R |
| 5,224,292 A | 7/1993 | Anton | 47/64 |
| 5,326,192 A * | 7/1994 | Freed | 47/9 X |
| 5,363,593 A | 11/1994 | Hsh | 47/59 |
| 5,397,368 A * | 3/1995 | Molnar et al. | 47/9 X |
| 5,429,783 A | 7/1995 | Kirkbride | 264/117 |
| 5,507,845 A * | 4/1996 | Molnar et al. | 47/56 X |
| 5,587,239 A * | 12/1996 | Ueba et al. | 428/362 |
| 5,741,832 A * | 4/1998 | Spittle | 47/9 X |

FOREIGN PATENT DOCUMENTS

| | | | |
|---|---|---|---|
| EP | 0117766 | 9/1984 | A01G/31/02 |
| EP | 0369771 | 5/1990 | A01G/31/00 |
| JP | 58-23042 | 5/1983 | A01G/1/10 |
| JP | 360005923 A * | 1/1985 | |
| JP | 3-45710 | 2/1991 | D01F/6/62 |
| JP | 92-9411 | 10/1992 | C05F/11/02 |
| JP | 7-123874 | 5/1995 | A01G/18/00 |

* cited by examiner

*Primary Examiner*—Peter M. Poon
*Assistant Examiner*—Jeffrey L. Gellner

(57) ABSTRACT

The present invention relates to a soil substitute useful in supporting plant growth. More particularly, the present invention relates to biodegradable and non-biodegradable polymer fibers for use in plant cultivation.

19 Claims, No Drawings

METHOD OF SUPPORTING PLANT GROWTH USING POLYMER FIBERS AS A SOIL SUBSTITUTE

CROSS REFERENCE TO RELATED APPLICATIONS

This application was filed under 35 U.S.C. 371 from International Application No. PCT/US98/26426 filed Nov. 12, 1998 which claims priority benefit of Provisional Application No. 60/068,221 filed Dec. 19, 1997, now abandoned.

FIELD OF THE INVENTION

The present invention relates to a soil substitute useful in supporting plant growth. More particularly, the present invention relates to biodegradable and non-biodegradable polymer fibers for use in plant cultivation.

BACKGROUND OF THE INVENTION

In the conventional cultivation of plants, regardless of being indoor or outdoor, naturally produced soil has been used as the medium for storing and supplying the nutrients, air, and moisture necessary for raising plants. It is now well known in the art that artificial media can be used for the germination, rooting and propagation of plants. Media such as peat moss, vermiculite, perlite, wood bark, sawdust, certain types of fly ash, pumice, plastic particles, glass wool, and certain foams are commonly used, or have been disclosed in the literature, either alone or in various admixtures with each other and/or soil.

Although these prior art media are useful and have achieved commercial acceptance in many areas, they do not provide an optimal balance between water and the gases that can significantly influence root and total plant growth. It is well known that plants growing in such commonly used media identified above can, under some conditions, suffer from lack of oxygen or show symptoms commonly believed to be caused by over-watering, i.e., chlorosis, slow growth, pale color, and even death.

U.S. Pat. No. 5,363,593 (Hsh) describes a synthetic cultivation medium comprised of fibrous glomerates and a method of manufacturing the same. Absent a soil component, the synthetic cultivation medium is manufactured from scrap, man-made textiles, chiefly polyacrylonitrile or polyester fibers. Scrap textile fabrics are shredded into short fibers and chemically refined and bleached. Prior or subsequent to the chemical refinement and bleaching, the short fibers are agitated into glomerates of intertwined fibers. The fiber length is preferably <10 mm, and the diameter of the glomerates is preferably within the range of 2–8 mm. Hsh's uncrimped fiber glomerates are dense and thus wick water more and hold less water than a medium that is less dense. These fiber glomerates are likely to revert back to fibers upon vigorous or prolonged contact. In addition, the glomerates of Hsh are described therein as nearly invulnerable to the degradative effects of natural decomposition.

It is a purpose of the present invention to provide a method of supporting plant growth which eliminates or minimizes the plant growth problems mentioned above.

It is a purpose of the present invention to provide a method of supporting plant growth which provides a plant growth medium that, upon the addition of water and appropriate nutrients, can be used for the germination of seeds and growth of seedlings, the vegetative propagation and growth of other plant material, and the growth of plants to maturity or some other stage of growth and development.

It is a further purpose of this invention to provide a method of supporting plant growth by providing a plant growth medium that that can be used to replace all or a substantial amount of conventional materials such as normal soils, soil mixtures, clay, vermiculite, perlite, peat moss, bark wood shavings or chips, and the like, thus substantially improving total water holding ability and maintaining a more optimal balance between solids, water, and gases.

A further purpose of the invention is to provide a method of supporting plant growth which provides a plant growth medium that can be biodegradable to serve as a soil substitute or a soil supplement for starting seedlings to be transplanted to fields. Such a medium would exhibit considerable water retention and high property retention for a period of time prior to transplanting, but would after a certain period of time thereafter be sufficiently degraded to be "plowed under".

SUMMARY OF THE INVENTION

The present invention concerns a method of supporting plant growth, comprising contacting plant material with a plant growth medium comprising fiberballs in an amount effective to support plant growth, each fiberball consisting essentially of randomly-arranged, entangled, crimped polymer fiber having a cut length of about 0.5 to about 60 mm.

In one preferred embodiment, the plant growth medium comprises biodegradable fiberballs prepared from polyester fibers. In another preferred embodiment, the plant growth medium comprises non-biodegradable fiberballs prepared from polyester fibers.

DETAILED DESCRIPTION OF THE INVENTION

The present invention concerns a method of supporting plant growth, comprising contacting plant material with a plant growth medium comprising fiberballs in an amount effective to support plant growth, each fiberball consisting essentially of randomly-arranged, entangled, crimped polymer fiber having a cut length of about 0.5 to about 60 mm.

Various types of natural and synthetic organic polymer fibers are suitable for use in the present invention. Synthetic organic polymer fibers are preferred. As used herein, the term "synthetic organic polymer fibers" includes fibers prepared from polymers such as polyesters; polyacrylonitrile; polyvinyl alcohol; polyolefins; polyamides, such as nylon; acrylics; polylactides; and the like; as well as polymers derived from cellulose, such as viscose rayon, cellulose acetate; and the like. Blends of any of the foregoing polymers are also useful in the present method, for example nylon and polyester. Preferred synthetic organic polymers for making fiber useful in the present method are polyester, polyamide, or blends thereof. Polyethylene terephthalate is most preferred.

The term "natural organic polymers" includes polymers such as wool, cotton, jute, silk, hemp, bagasse, cellulose, and blends thereof. Preferred natural organic polymers are cotton, cellulose, bagasse, and hemp.

The fibers useful in the present invention can comprise hollow or solid fibers and are generally made from polymer fibers in staple form of various cut lengths. The fibers for use in the plant growth medium of the method of the present invention generally are staple fibers having a cut length in the range of about 0.5 mm to about 60 mm. Silicone slickeners may be added to the fiber to improve lubricity and aesthetics. Such silicone slickeners are added by coating the fibers with the slickeners in an amount about 0.15 to about 0.5% Si by weight of the fibers (see U.S. Pat. Nos. 4,618,531 and 4,783,364, incorporated by reference herein).

The fibers used in preparing the fiberballs herein are crimped. Spirally crimped fibers, i.e. fibers having a 3-dimensional helical crimp are preferred. Such crimping can be provided by asymmetric jet-quenching of freshly-extruded filaments, as taught, e.g. in Killian U.S. Pat. Nos. 3,050,821 and 3,118,012 incorporated by reference herein, or by the method disclosed in Evans et al., U.S. Pat. No. 3,671,379, incorporated by reference herein. Most preferred are spiral crimps in the form of an omega-crimp, as disclosed in U.S. Pat. No. 4,783,364, incorporated by reference herein. Fibers with 2-dimensional saw-tooth crimp induced by mechanical means, such as a stuffer box, can also be used herein.

The polymer fibers are used herein in the form of fiberballs. By "fiberball" is meant polymer fibers which have been formed into substantially rounded bodies. The fiberballs preferably have an average dimension of about 1 to 15 mm, at least 50% by weight of the balls preferably having a cross-section such that its maximum dimension is not more than twice its minimum dimension. Polymer fibers in the shape of small, flattened discs mixed with larger cylindrical shapes (referred to as tails) can also be useful in the present method and are included in the definition of fiberball. There are a variety of methods for preparing the fiberballs of the present invention including by agitating, rolling, and/or tumbling. Crimped fibers interlock to form very low density fiberballs having an essentially permanent structure. A preferred fiberball is formed in accordance with the processes disclosed in detail in U.S. Pat. Nos. 4,618,531 and 4,783,364 which are incorporated by reference herein. The processes involve repeatedly air-tumbling small tufts of fiber against the wall of a vessel. Generally, any machine capable of agitating fibers to render them stably entangled can be used to prepare fiberballs useful in the present invention. Fiberballs having a cohesion measurement, as defined in U.S. Pat. Nos. 4,618,531 and 4,783,364, of less than about 15 Newtons (15N) are preferred.

Both biodegradable and non-biodegradable organic polymers are suitable for the polymer fiber useful in the present invention. Non-biodegradable fibers include certain polyesters, polyamides, acrylics, polyvinyl acetate, polyacrylonitrile, polyvinyl chloride, and blends thereof. Preferred non-biodegradable polymers are polyester, polyamide, or blends thereof. Most preferred non-biodegradable polymers are poly(ethylene terephthalate). COMFOREL® fiber, sold by E. I. du Pont de Nemours and Company, is preferred as a non-biodegradable fiber for use in preparing the fiberballs useful in the present invention. Such fiberballs are particularly suitable in situations where biodegradability is not required, such as for use with house plants.

Biodegradable fibers include certain synthetic fibers such as various polyesters, and natural fibers such as wool and cotton. A preferred biodegradable fiber is polyester, and a most preferred polyester is a copolymer of poly(ethylene terephthalate) and diethylene glycol or a non-aromatic diacid, such as adipic acid or glutaric acid, and an alkali metal or alkaline earth metal sulfo group, such as 5-sulfoisophthalic acid or a metal 5-sulfoisophthalic acid derivative, as disclosed in U.S. Pat. Nos. 5,053,482; 5,097,004; 5,171,308; 5,171,309; 5,219,646; and 5,295,985; incorporated by reference herein, and commercially available as BIOMAX® fiber from E. I. du Pont de Nemours and Company, Wilmington, Del.

The present invention also provides fiberballs comprising biodegradable polymer fiber having a cut length of about 0.5 mm to about 60 mm, and each fiberball having an average dimension of about 1 to 15 mm, at least 50% by weight of the fiberballs having a cross-section such that its maximum dimension is not more than twice its minimum dimension. The fibers can be coated with a silicone slickener in an amount of about 0.15 to about 0.5% Si by weight of the fibers. In addition, the fibers or the fiberballs can be dyed or pigmented. Preferably, the fibers are randomly-arranged, entangled, and crimped with the fiberballs having a cohesion measurement of less than about 15 Newtons. Preferably such crimped fibers are spirally crimped, omega crimped or saw-tooth crimped. Such biodegradable fiberballs are preferably prepared from polyester fiber, most preferably from polyester which is a copolymer of poly(ethylene terephthalate) and diethylene glycol or a non-aromatic diacid, and an alkali metal or alkaline earth metal sulfo group.

A further invention provided herein concerns a process for making such biodegradable fiberballs, such process comprising repeatedly tumbling by air small tufts of biodegradable polymer fibers against the wall of a vessel to provide an assembly of fiberballs.

The useful life of the plant growth medium useful in the present method depends on the type of polymer fiber used and in particular whether of not it is biodegradable.

Because easily-dyeable polymers can be used herein, the method of the present invention may further comprise contacting said fibers or fiberballs with a dye. The fibers useful in the present invention may additionally contain pigments so as to produce colored fiberballs. Thus, the plant growth medium useful in the present method can play a role in interior decoration.

The method of the present invention pertains to supporting plant growth. By "support" or "supporting" is meant that the medium assists in providing plant material with a means for subsisting. By "plant material" is meant seeds, germinated seeds, seedlings, sprouts, shoots, tubers, bulbs, plants, or any part of a plant capable of growth on its own, for example cuttings, or the like.

By "contacting" is meant placing the plant growth medium comprising fiberballs sufficiently close to the plant material to enable the plant growth medium to support plant growth. This can include combining the plant material with the plant growth medium, entangling plant material within a group of fiberballs of the plant growth medium, inserting plant material by hand within a group of fiberballs of the plant growth medium, placing plant material on top of the plant growth medium, applying additional plant growth medium around or on top of the plant material, combinations thereof, and the like.

The amount of fiberballs used will vary depending on the type and size of the plant material and whether the plant growth medium further comprises one or more conventional plant medium. For example, the amount of fiberballs initially used to germinate a seed can be a layer only one or a few fiberballs thick, although thicker layers may be used by applying additional fiberballs around or on top of the seed. A surprising small amount of fiberballs can be used in germination (see Example 1 below). Once a seed has sprouted into a seedling plant additional fiberballs may be added as needed. The plant growth medium useful in the present invention permits good anchoring of the growing roots. When transplanting, the fiberballs around the plant material remain as a coherent mass making transplanting a facile operation.

A problem with growing plants in pots, in other sorts of indoor growing containers, or even in fields is getting adequate water and oxygen to the roots of the plant. In addition to providing adequate water and oxygen to the roots, the plant growth medium of the present method can exhibit many features and advantages, some of which may depend in part on the type of fiber selected for use in preparing the fiberballs used herein: resistance to decay or biodegradable, resistance to microbes, lightness, and a morphology and density particularly conducive to plant growth.

The poor water retention properties of conventional plant media make it necessary to be selective with regard to the type of grain or plant to be cultivated, and the number of times it needs to be watered would need to be increased. However, the plant growth medium useful in the present method has very good moisture retention characteristics. For example, fiberballs prepared from COMFOREL® can absorb up to 30 times their weight in water. Good drainage is also evident from the method of the present invention.

Because of its unique morphology, large quantities of air are retained between the fiberballs, and thus the plant growth medium useful in the present method provides adequate amounts of oxygen to the roots. In addition, this morphology enables good thermal insulation.

Conventional plant growth media are watered from the top and kept out of excess water to prevent water wicking to their top surfaces. Water on the top surface of a plant growing media will often kill a seedling via a process known as "damp off." Another highly useful attribute of the fiberballs useful in the present method is that they do not appear to wick water to the surface (see Example 4 below), thus offering the potential to reduce evaporation losses. By not wicking water to their top surfaces, the fiberballs useful in the present invention enables watering plants from the bottom. However, the structure of the fiberballs make possible sufficient capillary action for retaining liquids close to plant roots. Such a quality promotes the growth of prosperous and well-developed plant root systems and enables the use of the present method in hydroponic systems.

Environmental harm to rivers and streams is reduced by using the present method because nutrients are adsorbed and retained by the plant growth medium and not washed away by rain. In addition, no more fertilizer than necessary need be provided using this method. Thus, the fiberballs, preferably the biodegradable fiberballs of the present invention, can be used in "precision farming." By "precision farming" is meant a farming method wherein a seed, cutting or seedling is placed into the ground along with a precisely placed addition of nutrients, pesticides, etc. The advantage provided by precision farming is it avoids the surface application of agricultural chemicals that ultimately are washed away into the water table. Using the biodegradable fibers of the present invention together with conventional plant growth material provides a convenient method for precision farming wherein the agricultural chemicals can be added together with the fiberballs or can be applied to the fiberballs after the plant material and fiberballs are placed in the group.

Because plants can be cultivated without using any natural soil at all, the plant growth medium of the present method can be hygienic. Because certain embodiments of the plant growth medium of the present method are prepared from synthetic fibers, the medium can be sterile and can be particularly suited for growing sensitive plants.

When prepared from synthetic polymer fibers, the fiberballs of the plant growth medium can be resistant to microbes and thus less susceptible to bacterial, viral, fungal and insect infestation. Thus, utilization of such plant growth medium would alleviate the need to use environmentally hazardous fungicides, insecticides or other infestation controlling chemicals and make more desirable distribution of plants marketed intact with root systems.

The plant growth medium of the present invention is particularly suitable for use as a growth medium for seed germination testing. Nurseries test seed germination rates and are confronted with the difficulty of finding consistent, reproducible growth media. Conventional growth media vary due to different points of origin as well as due to aging effects. For example, organic material such as peat moss degrades over time giving a higher acid content. The fiberballs of the present invention overcome these difficulties by providing a sterile, consistent growth medium for seed germination testing.

Once a crop has been harvested, biodegradable plant growth medium useful in the present invention is much more suitable for composting due to its degradable nature. Biodegradable fiberballs can be used in a field as needed and readily plowed under because they would physically come apart. The individual fibers of the fiberballs can be allowed to degrade more slowly since degradation would no longer be required to achieve the "plowed under" capability.

The comparative light weight of the fiberballs useful in the present invention makes them especially suitable for cultivation in special regions, such as mountains or the coast, infertile natural environments, or urban areas. In the urban environment, the light weight of the fiberballs makes them particularly suitable for cultivating plants in rooftop gardens, terraces, and balconies. Standing in marked contrast to comparatively heavy soil, the light weight. of the fiberballs also contributes to their ease of transport, and manipulation. Consequently, the back-breaking toil often associated with tilling and preparing farm land is avoided. In addition, the fiberballs provide better air availability and higher water holding capacity than other lightweight synthetic soils such as those made of polystyrene foam. Further, the fiberballs are safe to handle and can be stored substantially indefinitely.

Although fiberballs in themselves contain no available sources of plant nutrition, they do demonstrate good nutrient adsorption characteristics. Thus, the method of the present invention can further comprise contacting said plant growth medium, said plant material, or both, with at least one plant adjuvant. Contacting via spraying, dipping, irrigating, and/or the like with a balanced nutrient liquid is easily achieved in accordance with known hydroponic, agricultural, or horticultural principles. Likewise, the method of the present invention can further comprise providing light as needed to foster growth.

One benefit of providing plants with nutrients hydroponically is that the problems associated with soil depletion and decomposition are avoided. Other costly traditional means of farming, such as crop rotation, are also avoided.

Water-soluble adjuvants for use in preferred embodiments of the present invention include nutrients, fertilizers, fungicides, algaecides, weed killers, pesticides, hormones, bactericides, plant growth regulators, insecticides, combinations thereof, and the like. Numerous water-soluble plant fertilizers or nutrients are available commercially. Suitable fungicides include benomyl and other benzimidazoles (e.g. Benlate® sold by E. I. du Pont de Nemours and Company), flusilazole and other triazoles (e.g., Nustar® sold by E. I. du Pont de Nemours and Compny, metalaxyl and other acylalanines (e.g., Ridomil® sold by Ciba-Geigy Corp.), and tridemorph and other morphlines (e.g., Calixine® sold by BASF), among others. Suitable insecticides include oxamyl and other related carbamates (e.g., Vydate® sold by E. I. dupont de Nemours and Company), acephate (e.g. Orthene® sold by Chevron Chemical Co.), resmethrin and other pyrethrodis (e.g., Synthrine® sold by Fairfield American Corp.), among others. Suitable herbicides include chlorsulfuron and other sulfonylureas (e.g., Glena® sold by E. I. du Pont de Nemours and Company) among others. Combinations of fungicides, insecticides and fertilizers help protect young germinating seedling plants from disease and insect damage while supplying needed nutrients.

The plant growth medium useful in the method of the present invention can further comprise at least one conventional plant growth medium. Such conventional plant growth media include natural soil, soil mixtures, vermiculite, sand, perlite, peat moss, clay, wood bark, sawdust, fly ash, pumice, plastic particles, glass wool, and polyurethane foams, and combinations thereof.

With the growing demand for soil for plants used as decoration for room interiors and cultivated on balconies or rooftops, particularly urban areas, the present invention is useful in providing a plant growth medium as a soil substitute, including for hydroponic cultivation, as a soil supplement in flower pots, balcony planters, or in rooftop areas to cultivate plants, or as a supplement to other conventional plant growth media. In addition, by increasing the scale, the present method can also be used for processed horticulture and in raising grain.

EXAMPLES

In the examples below the following media were used: dry fiberballs, slick fiberballs, bio fiberballs, peat moss, and Metromix 360. The dry (unsized) fiberballs were COMFOREL® polyethylene terephthalate (PET) fiberfill obtained from E. I. du Pont de Nemours and Company. The slick fiberballs were COMFOREL® PET fiberfill wherein the fibers had been coated with a silicone slickener sizing. The slick fiberballs used in Example 1 are a different lot than those of the other examples. The Example 1 slick fiberballs have a higher bulk density. The bio fiberballs were prepared from BIOMAX®, subjected to mechanical saw-tooth crimping, followed by the fiberball construction processes disclosed in U.S. Pat. Nos. 4,618,531 and 4,783,364. The Canadian Sphagnum peat moss was obtained as a three cubic foot bag and was produced by ASB-Greenworld, Inc., P.O. Box 1728 Valdosta, Ga. 31603. The Metromix 360 growing medium is a combination of soilless mix ingredients of choice cut milled Canadian sphagnum peat moss, No. 3 grade horticultural vermiculite, tested wetting agents, starter nutrient charge, coarser horticultural perlite, selected washed granite sand and processed bark ash. The Metromix 360 is commercially sold and was obtained from E. C. Geiger, Inc., Harleysville, Pa. 19438.

Example 1

This experiment demonstrates the germination of seeds and their subsequent growth into plants in plant growth medium useful in the present method compared to peat moss.

Small rectangular poly(styrene) planters were used to plant twenty Wye soy bean and Rutgers tomato seeds each in each of the following media: slick fiberballs and Canadian Spaghnum peat moss (as received). The seeds had been refrigerated for storage with the Wye bean seeds dated 1989 and the Rutgers tomato seeds (lot 0620121006F) dated 1988. A volume of 57 milliliters was the target fill for the planters. An average of 2.19 grams of slick fiberballs and 19.9 grams peat moss was used to fill the planters. The seeds were placed ½" beneath the surface of the planting media. The planters were placed in two trays, tomatoes in one tray and Wye beans in the other. Within each tray the planters were positioned in alternating rows of each of the two different media. The trays containing the planters were placed in a greenhouse where they were watered from above on Monday, Wednesday and Friday with a nutrient solution. Ultimately, 11 Wye beans and 9 tomatoes grew in the slick fiberballs. No plants grew in the peat moss; however, a green substance (presumably algae) grew on the peat moss, and due to splashing during watering spread to the slick fiberballs.

Wye soy bean and tomato plants exceeding one foot in height grew in the slick fiberballs and were self supporting. The plants could be pulled from the planters and all of the slick fiberballs remained with the roots. Transplanting into larger planters was done easily by adding more slick fiberballs to the larger planter, positioning the plant with its original fiberballs in the center of the new larger planter, and adding more slick fiberballs around the sides of the plant. Transplanting with slick fiberballs was an easy and clean task.

Upon examination, the plant roots were found to be concentrated in the bottom of the planters with little or no root growth in the upper half of the slick fiberballs. Planters containing a Wye bean plant and a tomato plant were placed in a tray and a water level in the tray half way up the planters was maintained. Roots then grew throughout the height of the slick fiberballs for both types of plants.

Seeds germinated and grew in the slick fiberballs with surprisingly large plants growing in a relatively small amount of fiberballs. The plants could be removed from the planter, and the fiberballs remained a coherent mass (making transplanting a facile operation). It was found that the water level outside the planters could be adjusted to affect secondary root growth in plants cultivated with the slick fiberballs.

Example 2

This experiment demonstrates the germination of seeds and their subsequent growth into plants in plant growth medium useful in the present method compared to peat moss.

Ten Silver Queen Hybrid Corn seeds (NKLawn and Garden Company, Chattanooga, Tenn. packed for 1997 Lot 2) were planted in rectangular planters containing approximately 50 milliliters of dry fiberballs (average weight 1.31 grams), slick fiberballs (average weight 1.17 grams), and as received peat moss (average weight 16.17 grams). The seeds were planted ½" beneath the surface of the planting media. The seeds were watered with 15 milliliters of demineralized water containing liquid plant food (8:7:6 of nitrogen/phosphate/potash, respectively, at 10 drops per liter water). Watering was done three times per week thereafter.

The corn plants growth measurements 13 days after seed planting appear in Tables 1 and 2. Four corn seeds germinated and grew in each of the planting media. Plant heights above the top surface of the growth media were measured. Plant stalk breadths were measured at their largest value above the plant growth media, but below leaf growth. Table 2 gives the number of leaves on each of the four corn plants growing in the three different media. In Table 2, if the plant had not unfurled its leaves it was designated as "shoot". The maximum leaf widths were measured for each type of growth media.

TABLE 1

Corn Growth Results in PET Fiberballs and Peat Moss

| Media | Plant Height (cm)/Stalk Breadth (mm) | | | |
|---|---|---|---|---|
| Dry fiberballs | 18.5/3.0 | 17.2/3.0 | 14.2/2.5 | 11.2/2.5 |
| Slick fiberballs | 0.8/2.5 | 1.2/2.0 | 8.5/2.5 | 5.4/2.0 |
| Peat moss | 0.8/1.0 | 1.5/2.0 | 9.3/2.0 | 7.0/3.0 |

TABLE 2

Corn Leaf Growth

| Media | Number of Leaves | Maximum Leaf Width (mm) |
|---|---|---|
| Dry fiberballs | 3/3/3/3 | 13 |
| Slick fiberballs | shoot/shoot/2/3 | 10 |
| Peat moss | shoot/shoot/2/1 | 9 |

The data of Tables 1 and 2 clearly show dry fiberballs gave superior growth to peat moss. Comparing the corn plants in slick fiberballs and peat moss, those growing in the slick fiberballs appeared hardier.

Example 3

This experiment demonstrates the water retention of plant growth media useful in the present method compared to conventional plant growth media.

Six 100 milliliter Nalgene poly(propylene) beakers (model number 1201-0100) having ¼" diameter holes in the center of their bottoms were filled to 50 milliliters with the following media: dry fiberballs, slick fiberballs, bio fiberballs, Metromix 360, and peat moss. The beakers containing media were placed on top of an elevated wire rack to allow free drainage. To each of these beakers 100.0 milliliters of demineralized water was poured. The pouring of the 100 milliliter aliquots was done rapidly for all types of fiberballs; however, the slick fiberballs were held in place with two fingers because of their tendency to float. The 100 milliliter water additions to the Metromix 360 and peat moss were done slowly to prevent loss of the media through the hole in the beaker bottom. After addition of the 100 milliliters of water, the beakers containing the fiberballs were tilted to pour off any water that would leave. This pouring sometimes caused the wet mass of fiberballs to compress, much like the reaction of squeezing a sponge. As an example, the slick cluster retained 32.1 grams water per gram fiberballs prior to pouring off the water. Little attempt was made to pour water off the Metromix 360 or peat moss to prevent pouring off the media themselves, though excess water was clearly visible. Peat moss that had been thoroughly dried does not wet with the water.

Table 3 presents water retention data for the five different media. Peat moss as received and dried were both evaluated. The Metromix 360 and as received peat moss data are presented below as water retained on a dry media basis since these media initially contained 43.5% and 70% by weight water, respectively. The fiberballs contained less than one percent water initially, so no correction for initial water content was made.

TABLE 3

Water Retention of Various Media

| Media | Dry Media wt. (g) | Water Retained (g Water/g Media) | | | | |
|---|---|---|---|---|---|---|
| | | 1 Hr | 2 Hr. | 20 Hr. | 52 Hr. | 192 Hr. |
| Dry fiberballs | 0.87 | 36.2 | 34.5 | 32.7 | 28.5 | 16.3 |
| Slick fiberballs | 0.57 | 17.4 | 15.4 | 13.0 | 9.91 | dry |
| Bio fiberballs | 1.88 | 19.0 | 18.2 | 17.2 | 15.2 | 8.81 |
| Metromix 360 | 10.19 | 2.80 | 2.76 | 2.59 | 2.18 | 0.95 |
| (5.67 g + 4.43 g water) | 5.72 | 5.65 | 5.36 | 4.66 | 2.46 | |
| Peat moss (as received) | 14.02 | 1.95 | 1.60 | 1.81 | 1.51 | 0.56 |
| (4.21 g + 9.81 g water) | 8.84 | 8.77 | 8.38 | 7.36 | 4.21 | |
| Peat Moss (Dried) | 6.49 | Did Not Wet | | | | |

The data of Table 3 illustrates that the fiberballs have a high degree of water retention relative to conventional plant growth media.

Example 4

This experiment demonstrates the water wicking characteristics of plant growth media useful in the present method compared to conventional plant growth media.

The same type of beaker and the same five media as described in Example 3 were used. Two beakers were filled to 50 milliliters of each of the five growth media, and placed in a tray containing enough water to cover the 10 milliliter line on each beaker. Within 30 minutes the water had wicked to the top of the Metromix 360 and peat moss top surfaces. The beakers were removed from the water, their outside sides and bottoms dried and then weighed after 1 hr, after 18 hr, and after 50 hr. The slick fiberballs were floating atop the water for the 1 hour weighing.

Table 4 presents water wicking data for the five different media. The data for the Metromix 360 and peat moss were corrected for their respective dry weights.

TABLE 4

Water Wicking of Fiberballs and Conventional Plant Growth Media

| Media | Dry Media Wt. (g) | Water Wicking Height (% Wet) | Water Retained (g Water/g Media) | | |
|---|---|---|---|---|---|
| | | | 1 Hr. | 18 Hr. | 50 Hr. |
| Dry fiberballs | 0.81 | 40 | 16.0 | 16.8 | 16.7 |
| Slick fiberballs | 0.63 | 20 | 3.08 | 9.38 | 9.40 |
| Bio fiberballs | 1.88 | 80 | 14.5 | 14.2 | 13.8 |
| Metromix 360 | 13.30 | 100 | 2.30 | 2.31 | 2.27 |
| (7.51 g + 5.79 g water) | | 4.85 | 4.86 | 4.79 | |
| Peat moss (as received) | 14.52 | 100 | 1.52 | 1.68 | 1.63 |
| (4.36 g + 10.16 g water) | | | 7.40 | 7.94 | 7.72 |

As shown in Table 4 above, the fiberballs wicked water to varying degrees depending on whether they possessed the silicone sizing or not. In either case, the fiberballs did not wick water to their top surfaces as did conventional plant growth media.

Example 5
Comparison of Cluster Water Retention vs Conventional Plant Growth Media This experiment demonstrates that fiberballs can be packed into planter pots at various densities in order to obtain a desired level of water retention.

Planter pots having a volume of 55 cm³ were filled with various conventional plant growth media and fiberballs compacted to different densities. The conventional plant growth media filled the planters without compaction. The conventional plant growth media were those on hand in a greenhouse, and were in a condition to be used for planting without any additional treatments. An excess of water was poured into the filled planters and the weight of water retained recorded. Table 5 below lists the average weight of water retained for six trials.

The data below shows the fiberballs capable of retaining water amounts comparable to or exceeding those of conventional plant growth media.

TABLE 5

| Growth Media | Density (g/cm³) | Water Retained (g) |
| --- | --- | --- |
| Dry fiberballs | 0.05 | 36 |
| | 0.07 | 41 |
| | 0.10 | 45 |
| | 0.13 | 48 |
| Slick fiberballs | 0.01 | 07 |
| | 0.05 | 24 |
| | 0.07 | 28 |
| | 0.10 | 33 |
| | 0.13 | 40 |
| Sphagnum moss | 0.03 | 22 |
| Vermiculite course | 0.09 | 21 |
| Vermiculite fine | 0.09 | 27 |
| Perlite | 0.10 | 16 |
| Rockwool compote | 0.12 | 26 |
| Rockwool | 0.07 | 29 |
| Metro-mix 200 | 0.18 | 28 |
| Metro-mix 360 | 0.21 | 24 |
| Perlite super course | 0.13 | 14 |
| Metro-mix 510 | 0.24 | 22 |
| Metro-mix 300A | 0.24 | 23 |

What is claimed:

1. A method of supporting plant growth, comprising: contacting plant material with a plant growth medium comprising fiberballs in an amount effective to support plant growth, each fiberball consisting essentially of randomly-arranged, entangled, crimped polymer fiber having a cut length of about 0.5 to about 60 mm.

2. The method of claim 1 wherein the fiberballs have a cohesion measurement of less than about 15 Newtons.

3. The method of claim 1 wherein the fiberballs have an average dimension of about 1 to 15 mm, at least 50% by weight of the fiberballs having a cross-section such that its maximum dimension is not more than twice its minimum dimension.

4. The method of claim 1 wherein the fibers are spirally crimped.

5. The method of claim 1 wherein the fibers are omega-crimped.

6. The method of claim 1 wherein the fibers are saw-tooth crimped.

7. The method of claim 1 wherein the fibers are dyed or pigmented.

8. The method of claim 1 wherein the polymer fiber is prepared from a synthetic, non-biodegradable polymer.

9. The method of claim 1 wherein the fibers are coated with a silicone slickener in an amount of about 0.15 to about 0.5% Si by weight of the fibers.

10. The method of claim 9 wherein the polymer is selected from the group consisting of: polyester, polyamide, and blends thereof.

11. The method of claim 10 wherein the polymer is polyester.

12. The method of claim 1 wherein the polymer fiber is prepared from a synthetic, biodegradable polymer.

13. The method of claim 12 wherein the polymer is polyester.

14. The method of claim 13 wherein the polyester is a copolymer of poly(ethylene terephthalate) and diethylene glycol or a non-aromatic diacid, and an alkali metal or alkaline earth metal sulfo group.

15. The method of claim 1 wherein the plant material is a seed.

16. The method of claim 1 further comprising: contacting said plant growth medium, said plant material, or both, with at least one plant adjuvant.

17. The method of claim 16 wherein the at least one plant adjuvant is precisely applied.

18. The method of claim 16 wherein the plant material is cultivated hydroponically.

19. The method of claim 1 wherein the plant growth medium further comprises one or more convention plant medium selected from the group consisting of natural soil, soil mixtures, vermiculite, sand, perlite, peat moss, clay, wood bark, sawdust, fly ash, pumice, plastic particles, glass wool, polyurethane foams, and combinations thereof.

* * * * *